UNITED STATES PATENT OFFICE.

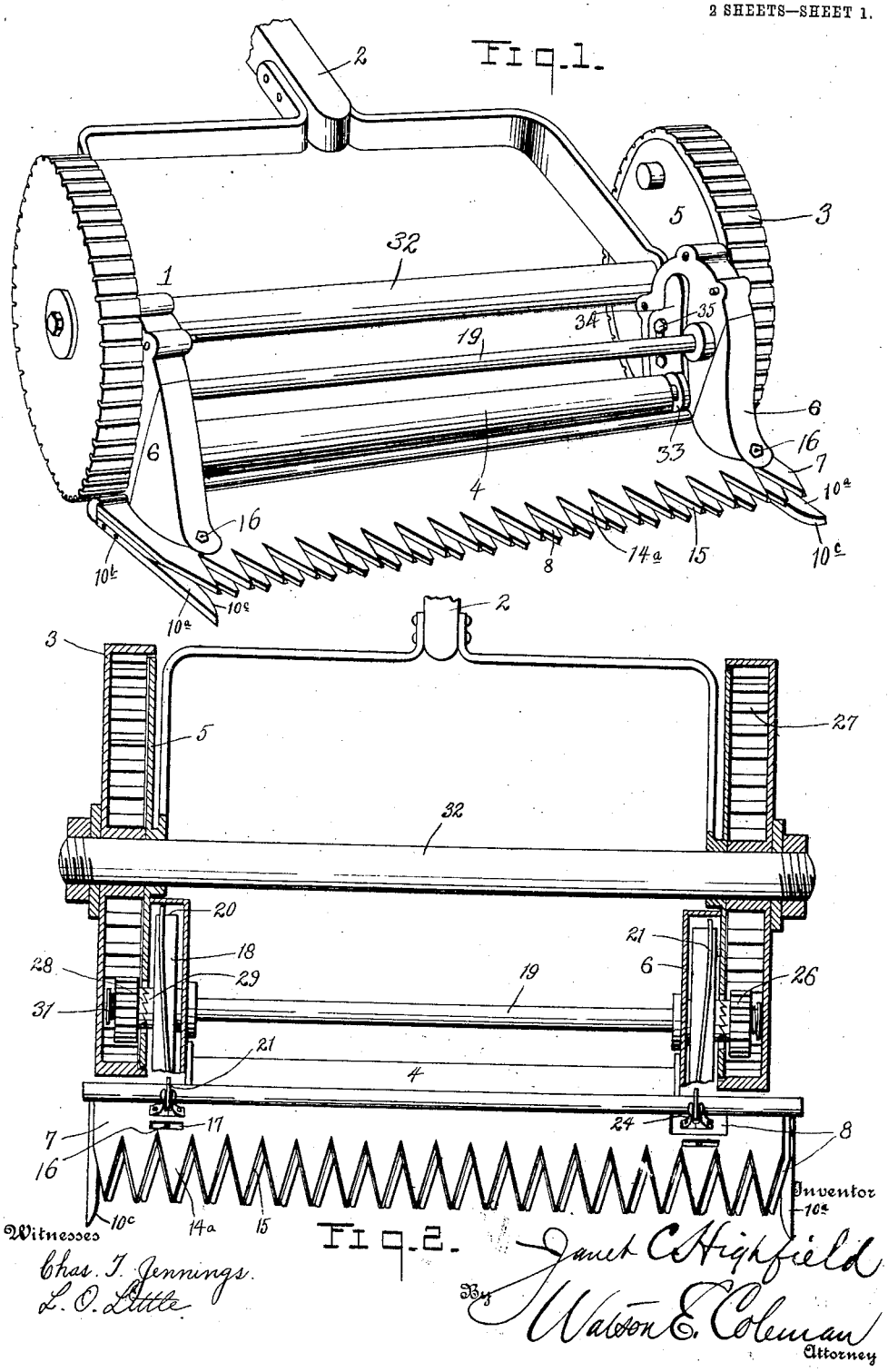

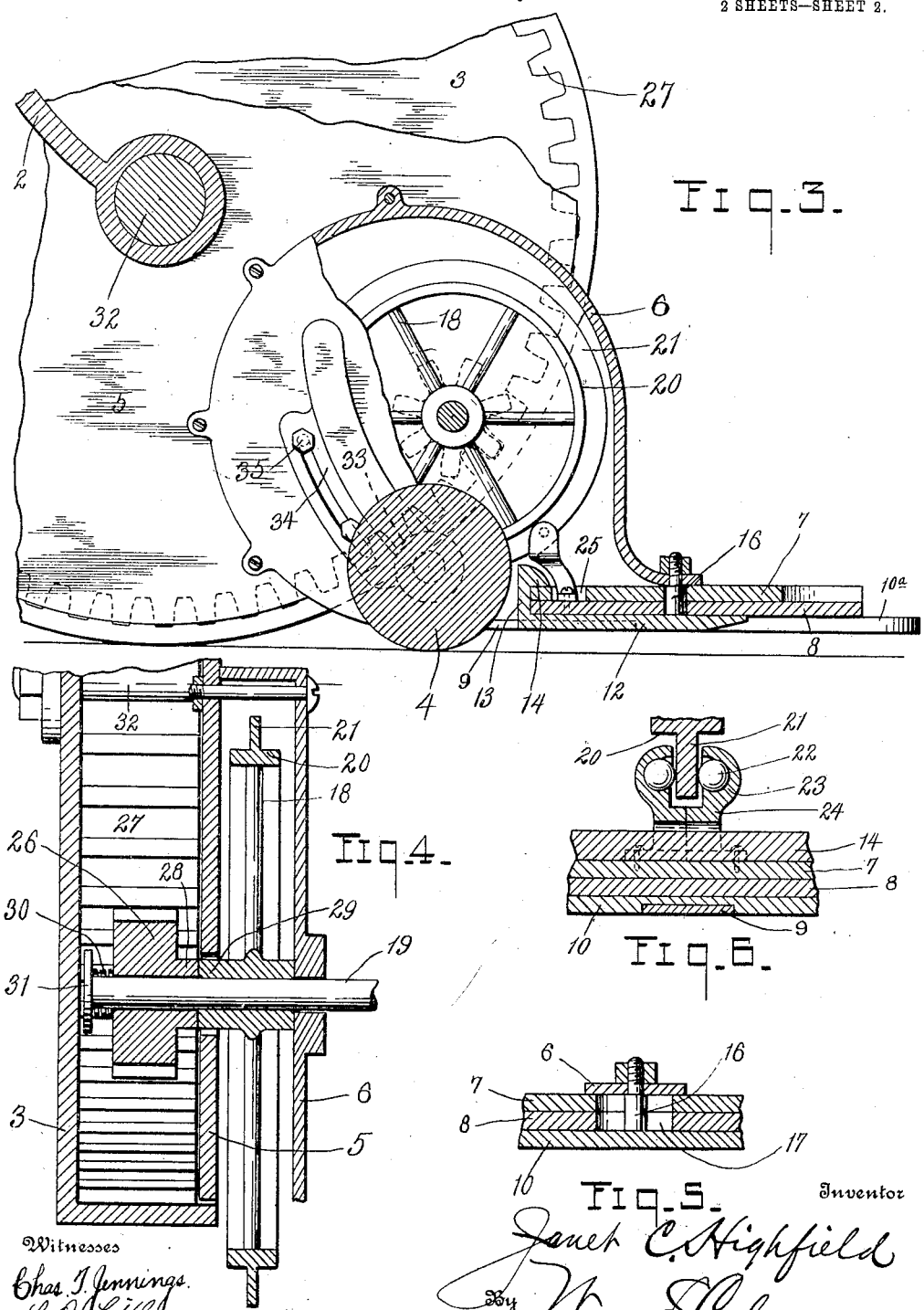

JANET COBURN HIGHFIELD, OF SCRANTON, PENNSYLVANIA.

LAWN-MOWER.

No. 912,127.  Specification of Letters Patent.  Patented Feb. 9, 1909.

Application filed December 19, 1907. Serial No. 407,192.

*To all whom it may concern:*

Be it known that I, JANET C. HIGHFIELD, a citizen of the United States, residing at Scranton, in the county of Lackawanna and State of Pennsylvania, have invented certain new and useful Improvements in Lawn-Mowers, of which the following is a specification, reference being had to the accompanying drawings.

My invention relates to improvements in lawn mowers and consists of the novel features of construction and the combination and arrangement of parts hereinafter fully described and claimed.

The object of the invention is to provide a lawn mower which will be simple and practical in construction and powerful in operation, and which will enable the grass to be cut close to walls, houses, tombstones and the like and under fences and shrubbery.

The above and other objects of the invention are attained in its preferred embodiment illustrated in the drawings, in which—

Figure 1 is a perspective view of my improved lawn mower; Fig. 2 is a top plan view, parts being broken away and in section; Fig. 3 is a detail vertical transverse section; Fig. 4 is a detail vertical section; Fig. 5 is a detail longitudinal section through the two cutter blades and their supporting and guiding bar; and Fig. 6 is a detail section through one of the cutter blades and the ball bearing lugs thereon.

My improved lawn mower comprises a suitable body or frame 1 provided with the usual handle 2 and mounted upon supporting and drive wheels 3 and a transverse roller 4. The body or frame 1 comprises two circular plates 5 which close the open inner faces of the wheels 3 and to which are secured casings or housings 6 for the mechanisms which actuate two reciprocating cutter blades 7, 8. The casings 6 may be of any suitable form and construction but are preferably made in separable sections to permit of ready access to said actuating or driving mechanisms. Said casings have their lower portions formed with tongues 9 which are secured in transverse recesses in the bottom of a supporting and guiding bar 10 on which the cutter blades 7, 8 are mounted for reciprocation.

In order to permit the machine to cut grass close to or under fences, walls and the like and to enable the driving wheels to run upon the cut portion of the ground I make the bar 10 and the cutter blades 7, 8 the full width of the machine so that their ends extend in front of the wheels 3. Said bar 10 is of substantially L-shape in cross section and consists of a base portion 12, a vertical rear portion 13 and a forwardly projecting longitudinal rib or flange 14 which overhangs the rear of the base portion. The cutter blades 7, 8 are similar, each having its front edge formed with V-shaped notches to provide similar shaped cutting teeth 14ª with beveled edges 15. The two blades are superposed and reciprocate upon the bar 10 with their straight rear edges in contact with the wall or portion 13 of said bar. They are retained upon the bar and guided in their reciprocatory movement by studs 16 which project vertically from the base portion 12 of the bar and through longitudinal slots 17 formed in said blades as more clearly shown in Fig. 5.

The cutter blades 7, 8 are simultaneously reciprocated in opposite directions by means of cam wheels 18 fixed upon a transverse drive shaft 19 journaled in bearings in the casings 6, said wheels 18 being arranged within the casings and having upon their flat peripheries or rims 20 radially projecting cam shaped flanges or ribs 21 which project between oppositely disposed bearing balls 22 arranged in sockets 23 formed in bearing brackets or lugs 24 secured upon said cutter blades. The bearing lugs 24 are arranged in pairs, one pair being secured to the upper cutter blade 7 adjacent to one of its ends and the other pair being secured to the lower cutter blade 8 adjacent to its opposite end, the blade 7 at the last mentioned end being formed with a longitudinal slot or recess 25 through which the bearing lugs project. The ends of the drive shaft 19 are extended into the supporting and drive wheels 3 and carry pinions 26 which mesh with internal gears 27 formed in said wheels 3. Clutch connections are provided between the pinions 26 and the shaft 19 so that when the mower is pushed forwardly the motion of the wheels 3 will be imparted to the shaft 19 but when the mower is drawn rearwardly the wheels and the pinions will be permitted to rotate without operating the shaft 19. This clutch connection is clearly shown in Fig. 4 of the drawings and consists in mounting the pinion loose upon the shaft and providing upon one of its faces a ratchet or clutch member 28 which is adapted to engage a similar ratchet or clutch member 29 formed upon the hub of one of the cam wheels 18. The ratchet or clutch members are held normally in engagement with each other by a coil spring 30 arranged upon the extreme end of the shaft 19 between the pinion and a washer 31. The wheels 3 are arranged upon a transverse axle or shaft 32 and their peripheries are preferably roughened by transverse grooves so that they will not readily slip upon the ground when the machine is pushed forwardly.

The roller 4 is arranged immediately in rear of the cutting mechanism and is adjustably mounted by arranging its journals in bearings 33 upon the lower ends of slotted plates 34, which latter are clamped upon the casings 6 by bolts 35.

In order to protect the teeth of the cutter blades and to direct the grass at the ends of the machine to said blades I preferably provide guard fingers 10$^a$. One of the latter is arranged at each end of the cutter blade supporting bar 10 and may be formed integral therewith or secured thereto by screws or similar fastenings 10$^b$. Said guard fingers project a sufficient distance in advance of the ends of the teeth of the cutter blades to effectively protect them against being pushed into or against a wall or the like, and the inner faces of said guard fingers are curved or inclined as shown at 10$^c$ to deflect the grass inwardly into the path of the cutter blades, which latter reciprocate above the guard fingers as will be readily understood upon reference to the drawings.

In operation, when the machine is pushed forwardly the movement of the wheels 3 will be imparted to the shaft 19 so that the cam wheels thereon will reciprocate the cutter blades 7, 8 simultaneously in opposite directions. Owing to the extension of the ends of the cutting mechanism so that they are disposed in advance of the supporting and drive wheels it will be seen that the path cut by the mower will be co-extensive with the width of the mower and that it will therefore cut close to walls, houses, tombstones and the like and under fences and shrubbery. This construction also causes the wheels 3 to rotate upon the cut portion of the ground and consequently enables the mower to be more effectively used in cutting tall grass. By constructing the cam wheels with their radially projecting flanges or cam ribs 21 and having the latter engage bearing balls in the lugs 24 a very powerful construction is provided and loss of power due to friction is reduced to minimum.

Having thus described my invention what I claim is:

1. In a lawn mower, the combination of a body or frame, supporting and drive wheels therefor, a cutter blade supporting bar arranged transversely and having its ends projecting in front of said wheels, superposed reciprocatory cutter blades upon said bar, pairs of spaced bearing lugs upon said cutter blades, a transverse driving shaft driven from said wheels, and cam wheels fixed on said driving shaft and having radially projecting cam shaped flanges to project between said spaced lugs for reciprocating the cutter blades simultaneously in opposite directions.

2. In a lawn mower, the combination of a frame or body comprising plates, casings connected thereto and a supporting bar connecting said casings, an axle, supporting and drive wheels upon the latter and formed with internal gears, a transverse drive shaft extending through said casings, pinions loose on said drive shaft and in mesh with said internal gears, clutch connections between said pinions and said shaft, cam wheels fixed on the shaft within the casings and formed with radially projecting cam shaped flanges, superposed cutter blades mounted for reciprocation upon said supporting and connecting bar, pairs of spaced bearing lugs upon said cutter blades and adapted to receive the flanges of said cam wheels, and an adjustably mounted supporting roller arranged between said casings, substantially as described.

3. In a lawn mower, the combination of a frame or body comprising plates, casings connected to the latter, a supporting bar connecting said casings, an axle, supporting and drive wheels upon the latter and provided with internal gears, a transverse drive shaft extending through the casings, pinions loose on said drive shaft and in mesh with said internal gears, clutch connections between said pinions and said shaft, cam wheels fixed on the shaft within the casings and formed with radially projecting cam-shaped flanges, superposed cutter blades mounted for reciprocation upon said supporting and connecting bar, and pairs of spaced bearing lugs upon said cutter blades and adapted to receive the flanges of said cam wheels.

4. In a lawn mower, the combination of a body or frame, supporting and drive wheels therefor, a cutter blade supporting bar arranged transversely, superposed cutter blades upon said bar, pairs of spaced bearing lugs upon said cutter blades, a transverse driving shaft, cam wheels fixed to the latter and having radially projecting cam-shaped flanges to project between said spaced lugs for reciprocating the cutter blades simultaneously in opposite directions, said supporting and drive wheels being formed with internal gears, pinions loose on said transverse drive shaft and in mesh with said internal gears and clutch connections between said pinions and said shaft.

In testimony whereof I hereunto affix my signature in the presence of two witnesses.

JANET COBURN HIGHFIELD.

Witnesses:
ANNA GERLACH,
JOHN McWILLIAM.